US008608601B2

(12) United States Patent
Kim

(10) Patent No.: US 8,608,601 B2
(45) Date of Patent: Dec. 17, 2013

(54) TENSIONING DEVICE

(75) Inventor: Ji Yong Kim, Nabari-shi (KR)

(73) Assignee: BorgWarner Inc., Auburn Hills, MI (US)

( * ) Notice: Subject to any disclaimer, the term of this patent is extended or adjusted under 35 U.S.C. 154(b) by 316 days.

(21) Appl. No.: 13/120,742

(22) PCT Filed: Sep. 25, 2009

(86) PCT No.: PCT/US2009/058336
§ 371 (c)(1),
(2), (4) Date: Mar. 24, 2011

(87) PCT Pub. No.: WO2010/036868
PCT Pub. Date: Apr. 1, 2010

(65) Prior Publication Data
US 2011/0201465 A1  Aug. 18, 2011

(30) Foreign Application Priority Data

Sep. 29, 2008  (JP) .................................. 2008-250886

(51) Int. Cl.
*F16H 7/08*  (2006.01)
(52) U.S. Cl.
USPC .......................................... 474/111; 474/101
(58) Field of Classification Search
USPC ................................. 474/111, 101
See application file for complete search history.

(56) References Cited

U.S. PATENT DOCUMENTS

| | | |
|---|---|---|
| 1,581,624 A | 4/1926 | Wunderlich et al. |
| 1,758,246 A | 5/1930 | Brackett et al. |
| 2,129,107 A | 3/1936 | Taylor |
| 2,044,158 A | 6/1936 | Dunlop |
| 2,066,721 A | 1/1937 | Eaton |
| 2,117,195 A | 5/1938 | McKerlie |
| 2,156,701 A | 5/1939 | Petersen |
| 3,136,169 A | 6/1964 | Karger et al. |
| 3,413,865 A | 12/1968 | Nimtz et al. |
| 3,811,332 A | 5/1974 | Brown et al. |
| 3,856,101 A | 12/1974 | Allison |
| 3,964,331 A | 6/1976 | Oldfield |
| 4,337,055 A | 6/1982 | Mackay et al. |
| 4,395,251 A | 7/1983 | King et al. |
| 4,553,509 A | 11/1985 | Mezger et al. |
| 4,973,290 A | 11/1990 | Hans et al. |

(Continued)

OTHER PUBLICATIONS

International Search Report for International Application No. PCT/US2009/058336, mailed May 14, 2010, 11 pages.

*Primary Examiner* — William A Rivera
*Assistant Examiner* — Michael Riegelman
(74) *Attorney, Agent, or Firm* — Brown & Michaels, PC

(57) ABSTRACT

ISSUE: A chain tensioning device with a short center distance that can impart a tensioning force to a plurality of chain spans at the same time with a simple structure. MEANS OF RESOLUTION: A tensioning device (1) includes a first tensioner arm (2) having an arm part (20) disposed outside a chain span $(C)_1$ and a flange part (21) integrated with the arm part (20) and projecting toward the internal space between chain spans $(C_1, C_2)$, a second tensioner arm (3) having an arm part (30) disposed outside a chain span $(C_2)$ and a flange part (31) integrated with the arm part (30), projecting toward the internal space between chain spans $(C_1, C_2)$, and overlapping the flange part (21), a linking part pivotably linking the flange parts 821, 31) at the overlapping portion of the flange parts (21, 31), and a tensioner (4) urging the first tensioner arm (2) toward the chain span $(C_1)$.

9 Claims, 17 Drawing Sheets

(56) References Cited

U.S. PATENT DOCUMENTS

| | | |
|---|---|---|
| 5,246,404 A | 9/1993 | Ojima |
| 5,266,066 A | 11/1993 | White |
| 5,702,318 A | 12/1997 | Hayafune et al. |
| 5,797,818 A | 8/1998 | Young |
| 5,967,922 A | 10/1999 | Ullein et al. |
| 6,129,644 A * | 10/2000 | Inoue ............................ 474/110 |
| 6,322,469 B1 | 11/2001 | Markley |
| 6,322,470 B1 * | 11/2001 | Markley et al. ............... 474/111 |
| 6,336,881 B1 | 1/2002 | Rapp et al. |
| 6,358,169 B1 | 3/2002 | Markley |
| 6,478,703 B2 | 11/2002 | Suzuki |
| 6,599,208 B2 | 7/2003 | Bianchi et al. |
| 6,623,391 B2 * | 9/2003 | Young et al. .................. 474/111 |
| 6,849,015 B2 * | 2/2005 | Markley et al. ............... 474/111 |
| 6,955,621 B2 | 10/2005 | Wigsten et al. |
| 7,097,579 B2 | 8/2006 | Markley |
| 7,455,606 B2 | 11/2008 | Markley et al. |
| 7,476,168 B2 * | 1/2009 | Markley et al. ............... 474/111 |
| 7,479,077 B2 * | 1/2009 | Markley et al. ............... 474/111 |
| 7,628,719 B2 * | 12/2009 | Markley ........................ 474/111 |
| 2002/0045503 A1 | 4/2002 | Young |
| 2002/0160868 A1 * | 10/2002 | Wigsten et al. ............... 474/101 |
| 2003/0153420 A1 | 8/2003 | Rogers |
| 2003/0228948 A1 * | 12/2003 | Garbagnati et al. .......... 474/110 |
| 2005/0085322 A1 * | 4/2005 | Markley ........................ 474/109 |
| 2006/0270502 A1 * | 11/2006 | Markley et al. ............... 474/111 |
| 2006/0293134 A1 * | 12/2006 | Markley et al. ............... 474/111 |
| 2007/0066428 A1 * | 3/2007 | Tryphonos .................... 474/111 |
| 2007/0142146 A1 * | 6/2007 | Tryphonos .................... 474/111 |

* cited by examiner

TENSIONING DEVICE

TECHNICAL FIELD

The present invention relates to a tensioning device for producing tension in a chain, and more specifically it relates to a device which is suitable for a chain drive device where there is a short center distance.

PRIOR ART

Tensioning devices are conventionally used in order to produce tension in a chain by removing slack in the chain which is generated during operation. Tensioning devices generally comprise a tensioner arm which is disposed on the slack-side span and provided so as to be able to pivot about a pivoting end while having a chain sliding surface on which the chain slides, and a tensioner which presses the tensioner arm toward the slack-side span in such a way that the chain sliding surface of the tensioner arm conies into contact with the slack-side span of the chain. In this case, a chain guide is generally provided on the tight-side span in order to guide the travel of the chain.

A tensioning device has also been proposed in which tensioning forces act on a plurality of spans of the chain at the same time. As disclosed in Japanese Unexamined Patent Application Publication 2006-329418, this tensioning device comprises: first and second tensioner arms which are disposed outside the tight-side span and slack-side span of the chain, respectively, and provided so as to be able to pivot about a pivoting end, respectively; a link structure which has first and second link members disposed between the respective tensioner arms and linked together by pins and which provides a link between each of the tensioner arms; and a tensioner in which the tip end of a piston is linked to the link pins of each link member (see FIGS. 4 and 7).

In this case, when the chain is subjected to elongation due to chain wear, the piston of the tensioner projects so as to press the link pins of the link members. By means of this, the link members both pivot in such a way that the included angle thereof decreases (see FIG. 5 of the above publication). As a result, the tensioner aims apply pressure to the corresponding chain span so that slack in each chain span is removed.
PATENT DOCUMENT 1
Japanese Unexamined Patent Application Publication 2006-329418 (see FIGS. 4 and 7)

DISCLOSURE OF THE INVENTION

Issues to be Resolved by the Invention

However, the device disclosed in the publication mentioned above is suitable for a chain in which there is a drive link between the drive sprocket (crank sprocket) and the driven sprocket (cam sprocket) of an engine, in other words a timing chain, and in this case the center distance between the sprockets is relatively long. Accordingly, there is a relatively long internal space between the chain spans in the device disclosed in that publication, which means that the tensioner can be disposed within that internal space.

However, when a chain is used in an engine auxiliary drive device or oil pump drive device, or similar, the center distance is short. In this case, it is not possible to ensure an adequate internal space between the chain spans, and therefore it is difficult to employ the tensioning device disclosed in the above publication.

The present invention has been devised in view of the conventional situation outlined above, and the issue to be resolved by the present invention lies in realizing a tensioning device for a chain drive device where there is a short center distance such as an auxiliary drive device or oil pump drive device in an engine, wherein a tensioning force can be imparted to a plurality of chain spans at the same time and the device has a simple structure.

Means of Resolving the Issues

The tensioning device according to the invention of claim 1 is a device for imparting a tensioning force to a chain having first and second chain spans. A first tensioner arm has: a first arm part, on which the chain slides, which extends in an arcuate shape along the first chain span and outside that first chain span and includes a pivoting end which is pivotably supported by means of a spindle and a free end; and a first flange part which is provided as a single piece with the first arm part and projects toward the internal space between the first and second chain spans. A second tensioner arm has: a second arm part, on which the chain slides, which extends in an arcuate shape along the second chain span and outside that second chain span and includes a pivoting end which is pivotably supported by means of a spindle and a free end; and a second flange part which is provided as a single piece with the second arm part and projects toward the internal space between the first and second chain spans, and overlaps the first flange part. Furthermore, the tensioning device is provided with: a linking part which is provided at the overlapping portion between the first flange part of the first tensioner arm and the second flange part of the second tensioner arm, and which pivotably links the first and second flange parts; and urging means for urging the free end of the first tensioner arm toward the first chain span side. When the urging means urge the free end of the first tensioner arm toward the first chain span side, the first flange part of the first tensioner arm causes the second flange part of the second tensioner arm to pivot by way of the linking part, so that the second arm part of the second tensioner arm moves toward the second chain span side.

With the invention disclosed in claim 1, when the tensioning device is operating, the urging means urge the free end of the first tensioner arm toward the first chain span side. When this happens, the first arm part of the first tensioner arm pivots about its pivoting end and the first arm part presses against the first chain span. This removes slack from the first chain span. Then, when the first arm part pivots, the second arm part of the second tensioner arm pivots about its pivoting end by way of the first flange part, linking part and second flange part, and the second arm part presses against the second chain span. This removes slack from the second chain span. This thereby makes it possible to impart a tensioning force to the chain.

In this case, a tensioner acting as the urging means is not disposed in the internal space between the first and second chain spans, and therefore it is possible to realize a tensioning device which is suitable for a chain drive device where there is a short center distance such as an auxiliary drive device or an oil pump drive device for an engine, in cases where it is not possible to ensure an adequate internal space between the chain spans. In this case too, the first and second tensioner arms are simply linked by means of the linking part via the first and second flange parts, and therefore the structure can be simplified.

In the invention disclosed in claim 2, which is in accordance with claim 1, the linking part comprises: a long hole which is formed through the overlapping portion of the second flange part; and a protrusion which is provided to protrude from the first flange part and is latched by the long hole, while also being able to slide in the long hole.

In this case, the linking part comprises a protrusion such as a pin or a screw, for example, and a long hole, and therefore the structure of the linking part can be simplified and this makes it possible to further simplify the structure of the device as a whole.

In the invention disclosed in claim 3, which is in accordance with claim 1, the linking part comprises: a first long hole which is formed through the overlapping portion of the first flange part; a second long hole which is formed through the overlapping portion of the second flange part and partly overlaps the first long hole; a third long hole which is provided on the mounting side of the tensioning device and extends in a direction intersecting the first and second long holes while partly overlapping the first and second long holes; and a protrusion which is latched by the overlapping portions of the first through third long holes while protruding from the third long hole, and is also able to slide along the overlapping portion of the first through third long holes when the first and second flange parts pivot.

In this case, when the protrusion moves along the first through third long holes during pivoting of the first and second tensioner arms, the protrusion is always latched by the overlapping portion of the first through third long holes, and therefore the second tensioner arm can be reliably prevented from pivoting away from the second chain span, even if the second chain span exerts an excessive pressing force on the second tensioner arm during operation.

In the invention disclosed in claim 4, which is in accordance with claim 1, the linking part comprises first and second tooth parts which are formed on the first and second flange parts, respectively, and which mesh together.

In this case, when the first tensioner arm pivots, the second tooth parts which mesh with the first tooth parts rotate, whereby the second tensioner arm pivots. In this case, the first and second tooth parts of the linking part always mesh, and therefore the second tensioner arm can be reliably prevented from pivoting away from the second chain span, even if the second chain span exerts an excessive pressing force on the second tensioner arm during operation.

In the invention disclosed in claim 5, which is in accordance with claim 1, the urging means consist of a tensioner which is disposed outside the first chain span and has a retractable piston.

In the invention disclosed in claim 6, which is in accordance with claim the urging means consist of a spring which has one end latched to the first flange part and the other end latched to the second flange part.

In this case, the tension from the spring allows the first and second tensioner arms to pivot closer to the first and second chain spans, respectively, by way of the first and second flange parts. In this case, the urging means consist of a simple spring and therefore the structure of the urging means, and thus the device as a whole, can be simplified.

In the invention disclosed in claim 7, which is in accordance with claim the spindle of the first or second tensioner arm is provided with a ratchet mechanism for allowing the first or second tensioner arm to move toward the first or second chain span side, while restricting movement in the opposite direction.

In this case, the ratchet mechanism makes it possible to reliably prevent the first and second tensioner arms from pivoting away from the first and second chain spans, even if an excessive pressing force is exerted by the first and second chain spans.

In the invention disclosed in claim 8, which is in accordance with claim 1, the spindle of the first or second tensioner arm is provided with a torsion coil spring for urging the first or second tensioner arm toward the first or second chain span side.

In this case, the urging means consist of a torsion coil spring and therefore the structure of the urging means, and thus the device as a whole, can be simplified.

Advantages of the Invention

As described above, with the tensioning device according to the present invention, the first and second tensioner arms are disposed outside the first and second chain spans, respectively, and first and second flange parts of the first and second tensioner arms are made to overlap each other; the first and second flange parts are pivotably linked by means of the linking part at the overlapping portion, and provision is made for urging means for urging the free end of the first tensioner arm toward the first chain span side, and therefore when the urging means urge the free end of the first tensioner arm toward the first chain span side, the first arm part of the first tensioner arm pivots about its pivoting end so that the first arm part presses against the first chain span, whereby slack is removed from the first chain span. Furthermore, when the first arm part pivots, the second arm part of the second tensioner arm pivots about its pivoting end, by way of the first flange part, linking part and second flange part, and the second arm part presses against the second chain span, whereby slack is removed from the second chain span. This makes it possible to impart a tensioning force to the chain.

In this case, a tensioner acting as the urging means is not disposed in the internal space between the first and second chain spans, and therefore it is possible to realize a tensioning device which is suitable for a chain drive device where there is a short center distance such as an auxiliary drive device or an oil pump drive device for an engine, in cases where it is not possible to ensure an adequate internal space between the chain spans. In this case too, the first and second tensioner arms are simply linked by means of the linking part via the first and second flange parts, and therefore the structure can be simplified.

PREFERRED MODES OF EMBODIMENT OF THE INVENTION

Exemplary embodiments of the present invention will be described below based on the appended figures.

Exemplary Embodiment 1

FIGS. 1 through 3A illustrate the tensioning device according to a first exemplary embodiment, where FIG. 1 is an oblique view of the overall tensioning device, FIG. 2 shows the state in FIG. 1 when a retaining nut has been removed, FIG. 2A is a schematic of FIG. 2, FIG. 3 is an oblique view of the overall tensioning device when the chain has undergone elongation, and FIG. 3A is a schematic of FIG. 3. Note that the drive sprocket and driven sprocket have been omitted in FIGS. 1, 2, 3, and the sprockets are shown schematically in FIGS. 2A and 3A.

As shown in FIGS. 1, 2 and 2A, this tensioning device 1 is a device for imparting tensioning force to a chain C which is wound around a drive sprocket D1 and a driven sprocket D2. The chain C is preferably a chain where there is a short center distance between the drive sprocket and driven sprocket, as in the case of an auxiliary drive device or an oil pump drive device. The chain C has first and second chain spans $C_1$, $C^2$ arranged between the drive sprocket D1 and the driven sprocket D2. In this instance, the chain span $C_1$ is the slack-side span and the chain span $C_2$ is the tight-side span.

The tensioning device 1 is provided with a first tensioner arm 2 which is disposed outside the first chain span $C_1$ and is intended for imparting a tensioning force to the first chain span $C_1$, and a second tensioner arm 3 which is disposed outside the second chain span $C_2$ and is intended for imparting a tensioning force to the second chain span $C_2$.

The first tensioner arm 2 has a first arm part 20, on which the chain C slides, which extends in an arcuate shape along the first chain span $C_1$ and includes a pivoting end 20A which is pivotably supported by means of a spindle (not depicted) and a free end 20B; and a first flange part 21 which is provided as a single piece with the first arm part 20 and projects toward the internal space between the first and second chain spans $C_1$, $C_2$. A through-hole 20a is formed at the pivoting end 20A. The spindle passes through the through-hole 20a, and this spindle is fixed to the engine side. A shoe 20C having a sliding surface for the chain C is fitted to the first arm part 20.

The second tensioner arm 3 has a second arm part 30, on which the chain C slides, which extends in an arcuate shape along the second chain span $C_2$ and includes a pivoting end 30A which is pivotably supported by means of a spindle (not depicted) and a free end 30B; and a second flange part 31 which is provided as a single piece with the second arm part 30 and projects toward the internal space between the first and second chain spans $C_1$, $C_2$, and which overlaps the first flange part 21. A through-hole 30a is formed at the pivoting end 30A. The spindle passes through the through-hole 30a, and this spindle is fixed to the engine side. A shoe 30C having a sliding surface for the chain C is fitted to the second arm part 30.

A linking part for pivotably linking the first and second flange parts 21, 31 is provided at the overlapping portion between the first and second flange parts 21, 31. This linking part comprises, at the overlapping portion, a long hole 31a which is formed through the second flange part 31, and a protrusion 22 which has one end embedded in the first flange part 21 and the other end projecting from the surface of the first flange part 21, and which engages with the long hole 31a of the second flange part 31 and is able to slide along the long hole 31a. The protrusion 22 is formed with a thread at the tip end in this case, and a retaining nut 24 screws together with this thread, with a washer 23 interposed. It should be noted that the protrusion 22 may also comprise a pin.

A tensioner 4 which acts as the urging means for urging the free end 20B of the first tensioner arm 2 toward the first chain span $C_1$ side is provided outside the first tensioner arm 2. The tensioner 4 has a retractable piston 4a, and the tip end of the piston 4a presses against the free end 20B of the first tensioner arm 2. Furthermore, the tensioner 4 has a tensioner body 40 which slidably houses the piston 4a, and the tensioner body 40 has mounting holes 40a for mounting the tensioner body 40 on the engine side. The tensioner 4 may be a hydraulic tensioner or a mechanical tensioner.

When the tensioning device 1 configured in the manner described above is operating, the piston 4a of the tensioner 4 urges the free end 20B of the first tensioner arm 2 toward the first chain span $C_1$ side. When this happens, the first arm part 20 of the first tensioner arm 2 pivots counter-clockwise in FIG. 2A about the pivoting end 20A, and the first arm part 20 presses against the first chain span $C_1$. This removes the slack from the first chain span $C_1$.

Furthermore, when the first arm part 20 pivots, the first flange part 21 also pivots, and the protrusion 22 which is embedded in the first flange part 21 then pivots counter-clockwise in FIG. 2A about the pivoting end 20A of the first arm part 20. By means of this, the second arm part 30 pivots clockwise in FIG. 2A about the pivoting end 30A of the second arm part 30, by way of the long hole 31a with which the protrusion 22 engages. At this point, as shown in FIGS. 3, 3A, the protrusion 22 moves to the right-hand end in the figure, inside the long hole 31a. By means of this, the second arm part 30 presses against the second chain span $C_2$, thereby removing the slack from the second chain span $C_2$. This makes it possible to impart a tensioning force to the chain C.

In this case, the tensioner 4 is not disposed in the internal space between the first and second chain spans $C_1$, $C_2$, and therefore it is possible to realize a tensioning device which is suitable for a chain drive device where there is a short center distance such as an auxiliary drive device or an oil pump drive device for an engine, in cases where it is not possible to ensure an adequate internal space between the chain spans. In this case too, the first and second tensioner arms 2, 3 are simply linked by means of the linking part via the first and second flange parts 21, 31, and moreover the linking part in this case comprises the protrusion 22 and the long hole 31 which engages therewith, and therefore the structure of the device as a whole can be simplified.

Second Exemplary Embodiment

FIGS. 4 through 5A illustrate a tensioning device according to a second exemplary embodiment of the present invention, where FIG. 4 is a schematic of the tensioning device, FIG. 4A is an enlarged partial view of FIG. 4, FIG. 5 is a schematic of the tensioning device when the chain has undergone elongation, and FIG. 5A is an enlarged partial view of FIG. 5. It should be noted that the same symbols as in the first exemplary embodiment described above are used in these figures for components which are the same or corresponding.

In the second exemplary embodiment, the structure of the linking part is different than that of the first exemplary embodiment which was described above. That is to say, as shown in FIGS. 4 and 4A, the linking part comprises, at the overlapping portion between the first flange part 21 of the first tensioner arm 2 and the second flange part 31 of the second tensioner arm 3: a first long hole 21a which is formed through the first flange part 21; a second long hole 31a which is formed through the second flange part 31 and extends in a direction intersecting the first long hole 21a while partly overlapping the first long hole 21a; a third long hole 5a which is provided on the mounting side of the tensioning device 1 (i.e., on the engine side) and extends in the vertical direction in the figures so as to intersect the first and second long holes 21a, 31a while partly overlapping the first and second long holes 21a, 31a; and a protrusion 50 which is latched at the overlapping portion of the first through third long holes 21a, 31a, 5a while projecting from the third long hole 5a, and which is able to slide along the overlapping portion of the first through third long holes 21a, 31a, 5a when the first and second flange parts 21, 31 pivot.

As shown in FIGS. 4 and 4A, before the chain has undergone elongation, the protrusion 50 is disposed at the right-hand end in the figures of the long hole 21a, at the left-hand end in the figures of the long hole 31a, and at the lower end in the figures of the long hole 5a.

During operation of the tensioning device 1, when the piston 4a of the tensioner 4 urges the free end 20B of the first tensioner arm 2 toward the chain span $C_1$ side, the first arm part 20 of the first tensioner arm 2 pivots counter-clockwise in FIG. 4 about its pivoting end 20A, and the first arm part 20 is pressed against the first chain span $C_1$, in the same way as in the first exemplary embodiment described above. This removes the slack from the first chain span $C_1$.

Furthermore, when the first arm part 20 pivots, the first flange part 21 also pivots, and at this point the second arm part 30 pivots clockwise in FIG. 4 about the pivoting end 30A, by way of the long hole 21a of the first flange part 21, the protrusion 50 which engages therewith, and the long hole 31a of the second flange part 31 with which the protrusion 50 engages. At this point, as shown in FIGS. 5, 5A, the protrusion 50 moves to the left in the figures inside the long hole 21a, while also moving to the right inside the long hole 31a, and it also moves upward in the figures inside the long hole 5a. By means of this, the second arm part 30 presses against the second chain span $C_2$, thereby removing the slack from the second chain span $C_2$. This makes it possible to impart a tensioning force to the chain C.

In this case, when the protrusion 50 moves along the first, second and third long holes 21a, 31a and 5a during pivoting of the first and second tensioner arms 2, 3, the protrusion 50 is always latched by the overlapping portion of the first, second and third long holes 21a, 31a and 5a, and therefore the second tensioner arm 3 can be more reliably prevented from pivoting away from the second chain span $C_2$, even if the second chain span $C_2$ exerts an excessive pressing force on the second tensioner arm 3 during operation.

Third Exemplary Embodiment

FIGS. 6 and 7 illustrate a tensioning device according to a third exemplary embodiment of the present invention, where FIG. 6 is a schematic of the tensioning device, and FIG. 7 is a schematic of the tensioning device when the chain has undergone elongation. It should be noted that the same symbols as in the first exemplary embodiment described above are used in these figures for components which are the same or corresponding.

In the third exemplary embodiment, the difference with the first and second exemplary embodiments described above lies in the fact that the urging means consist of a tension coil spring. That is to say, the urging means consist of a tension coil spring 6 of which one end 6a is latched onto the first flange part 21, and the other end 6b is latched onto the second flange part 31.

During operation, the tension from the coil spring 6 causes the first and second tensioner arms 2, 3 to pivot closer to the first and second chain spans $C_1$, $C_2$, respectively, by way of the first and second flange parts 21, 31. In this case, the urging means consist of a simple coil spring, and therefore the structure of the urging means, and thus the device as a whole can be simplified.

Fourth Exemplary Embodiment

FIGS. 8 and 9 illustrate a tensioning device according to a fourth exemplary embodiment of the present invention, where FIG. 8 is a schematic of the tensioning device, and FIG. 9 is a schematic of the tensioning device when the chain has undergone elongation. It should be noted that the same symbols as in the third exemplary embodiment are used in these figures for components which are the same or corresponding.

In the fourth exemplary embodiment, in the same way as in the third exemplary embodiment, the urging means consist of a tension coil spring, and one end 7a of the tension coil spring 7 is latched onto the first flange part 21 side, while the other end 7b is latched onto the second flange part 22 side. Note that, strictly speaking, the end 7a of the coil spring 7 is latched onto the protrusion 22 which is embedded in the first flange part 21.

During operation, the tension from the coil spring 7 causes the first and second tensioner arms 2, 3 to pivot closer to the first and second chain spans $C_1$, $C_2$, respectively, by way of the first and second flange parts 21, 31. In this case too, the urging means consist of a simple coil spring, and therefore the structure of the urging means, and thus the device as a whole, can be simplified.

Fifth Exemplary Embodiment

FIGS. 10 to 12 illustrate a tensioning device according to a fifth exemplary embodiment, where FIG. 10 is a schematic of the tensioning device, FIG. 11 is a schematic of the tensioning device when the chain has undergone elongation, and FIG. 12 is a partial view in cross section along the arrow XII in FIG. 10. It should be noted that the same symbols as in the third and fourth exemplary embodiments are used in these figures for components which are the same or corresponding.

This fifth exemplary embodiment involves combining the third and fourth exemplary embodiments, and tension coil springs 6, 7 are provided as the urging means. Furthermore, a ratchet mechanism 9 such as that shown in FIG. 12 is provided on the spindle of at least one of the first and second tensioner arms 2, 3, for example the spindle 8 of the second tensioner arm 3.

In FIG. 12, the lower end of the spindle 8 is screwed tight to a component on the engine E side. The spindle 8 passes through the through-hole 30a formed in the second arm part 30. A first ratchet part 90 having ratchet teeth on the lower surface is mounted on the spindle 8 in such a way that it can slide in the axial direction but cannot rotate. The first ratchet part 90 engages by way of a spline with the shaft part of the spindle 8, for example. The first ratchet part 90 is always urged downward by means of the elastic repelling force of a compression coil spring 91 which is fitted around the shaft part of the spindle 8 below the head part 80. Furthermore, a second ratchet part 92 having ratchet teeth on the upper surface which engage with the ratchet teeth of the first ratchet part 90 is fixedly attached to the opening of the through-hole 30a of the second arm part 30. The spindle 8 passes through the second ratchet part 92. The second arm part 30 is pivotably supported on the spindle 8 together with the second ratchet part 92.

The first and second ratchet parts 90, 92 etc. constitute a ratchet mechanism which allows the second tensioner arm 3 to move toward the second chain span $C_2$ side, while restricting movement in the opposite direction.

During operation, the urging force imparted to the first and second tensioner arms 2, 3 by the urging means is increased because the two tension coil springs 6, 7 are provided as the urging means, and this makes it possible to improve the responsiveness of the tensioner arms 2, 3 to elongation of the chain, while also making it possible to more reliably prevent slackness in the chain spans caused by resonance in the chain spans, or similar.

Furthermore, the ratchet mechanism is provided here, and therefore the second tensioner arm 3 can be even more reliably prevented from pivoting away from the second chain span $C_2$, even if the second chain span $C_2$ exerts an excessive pressing force on the second tensioner arm 3 during operation.

It should be noted that a similar ratchet mechanism may also be provided on the spindle on the first tensioner arm 2 side.

Sixth Exemplary Embodiment

FIG. 13 is a schematic of a tensioning device according to a sixth exemplary embodiment of the present invention. It should be noted that the same symbols as in the third through fifth exemplary embodiments are used in these figures for components which are the same or corresponding.

This sixth exemplary embodiment differs from the third through fifth exemplary embodiments described above in that the urging means consist of torsion coil springs. That is to say, the urging means include a torsion coil spring 15 which is disposed about the spindle 8 of the second tensioner arm 3, and a torsion coil spring 16 which is disposed about the spindle 8' of the first tensioner arm 2. One end of each of the torsion coil springs 15, 16 is latched onto the spindles 8, 8', while the other end is latched onto the pivoting parts 30A, 20A.

In this case, the elastic restoring force of the torsion coil springs 15, 16 causes the first and second tensioner arms 2, 3 to pivot closer to the first and second chain spans $C_1$, $C^2$. In this case, the urging means consist of simple torsion coil springs and therefore the structure of the urging means, and thus the device as a whole, can be simplified.

It should be noted that FIG. 13 shows an example in which the first and second tensioner arms 2, 3 are both provided with a torsion coil spring, but it is also possible to dispense with the torsion coil spring 15 on the second tensioner arm 3 side.

Seventh Exemplary Embodiment

FIG. 14 is a schematic of a tensioning device according to a seventh exemplary embodiment. It should be noted that the same symbols as in the first exemplary embodiment described above are used in these figures for components which are the same or corresponding.

A description has been given in each of the exemplary embodiments described above in which a protrusion and a long hole (or long holes) are used for the linking part between the first flange part 21 and the second flange part 31, but in the seventh exemplary embodiment, the linking part consists of first tooth parts 21A which are formed on part of the outer periphery of the first flange part 21, and second tooth parts 31A which are formed on part of the outer periphery of the second flange part 31 and mesh with the first tooth parts 21A.

In this case, when the piston 4a of the tensioner 4 projects, the first tensioner arm 2 pivots about the spindle of the pivoting part 20A, and at this point the first flange part 21 causes the second tensioner arm 3 to pivot about the spindle of the pivoting part 30A, by way of the first and second tooth parts 21A, 31A. This makes the first and second tensioner arms 2, 3 move closer to the chain spans $C_1$, $C_2$, respectively, whereby the slack is removed from the chain spans $C_1$, $C^2$.

In this case, the linking part does not project in the length direction of the spindles, and therefore this can make the device more compact overall.

It should be noted that in each of the exemplary embodiments described above, an example has been described in which the tensioning device according to the present invention is applied to a chain having two chain spans, but the present invention may also be applied to two chain spans of a chain having three or more chain spans.

KEY TO SYMBOLS

Figure 1:
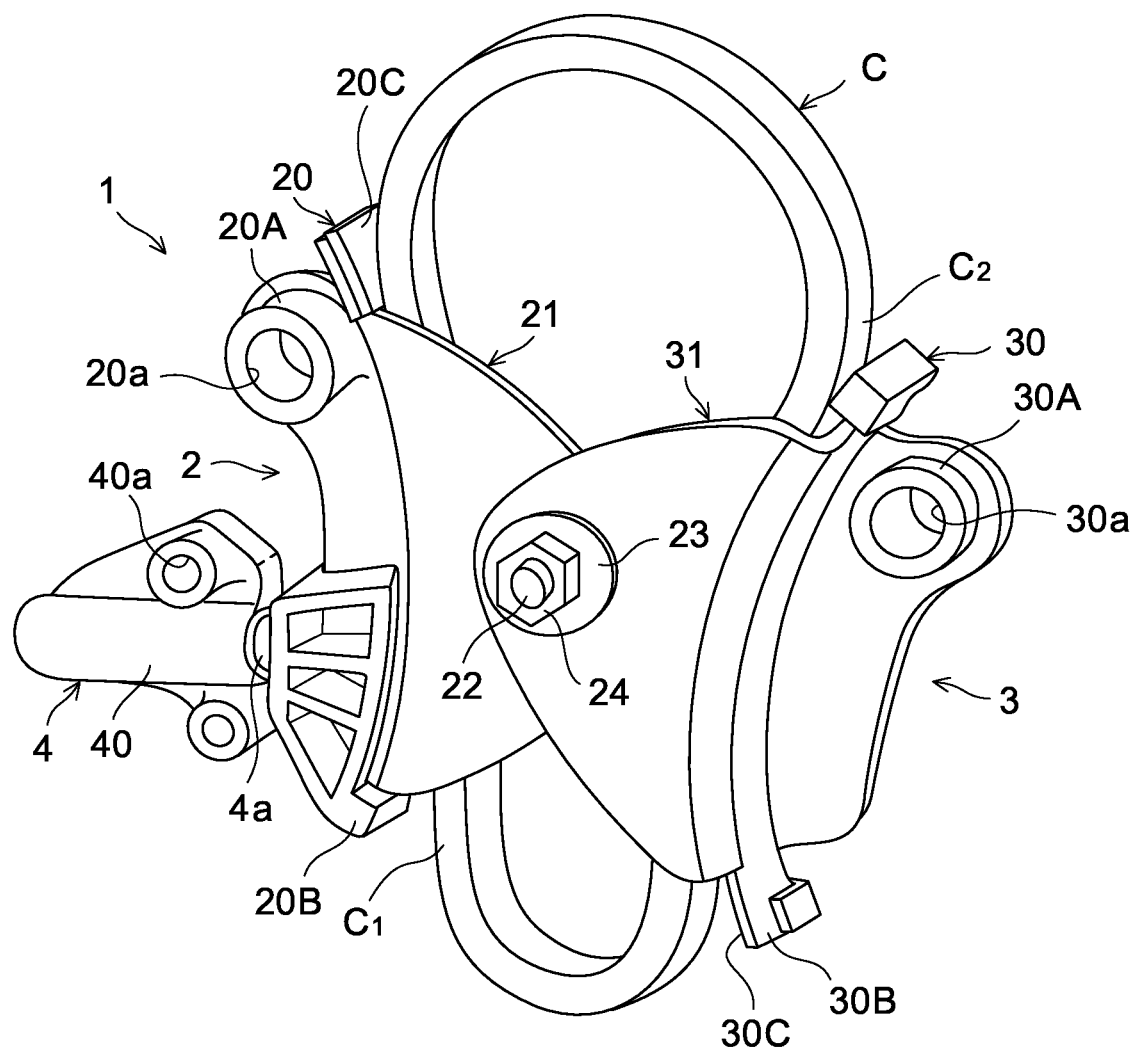
FIG. 1 is an oblique view of the overall tensioning device according to the first mode of embodiment of the present invention.
Figure 2:
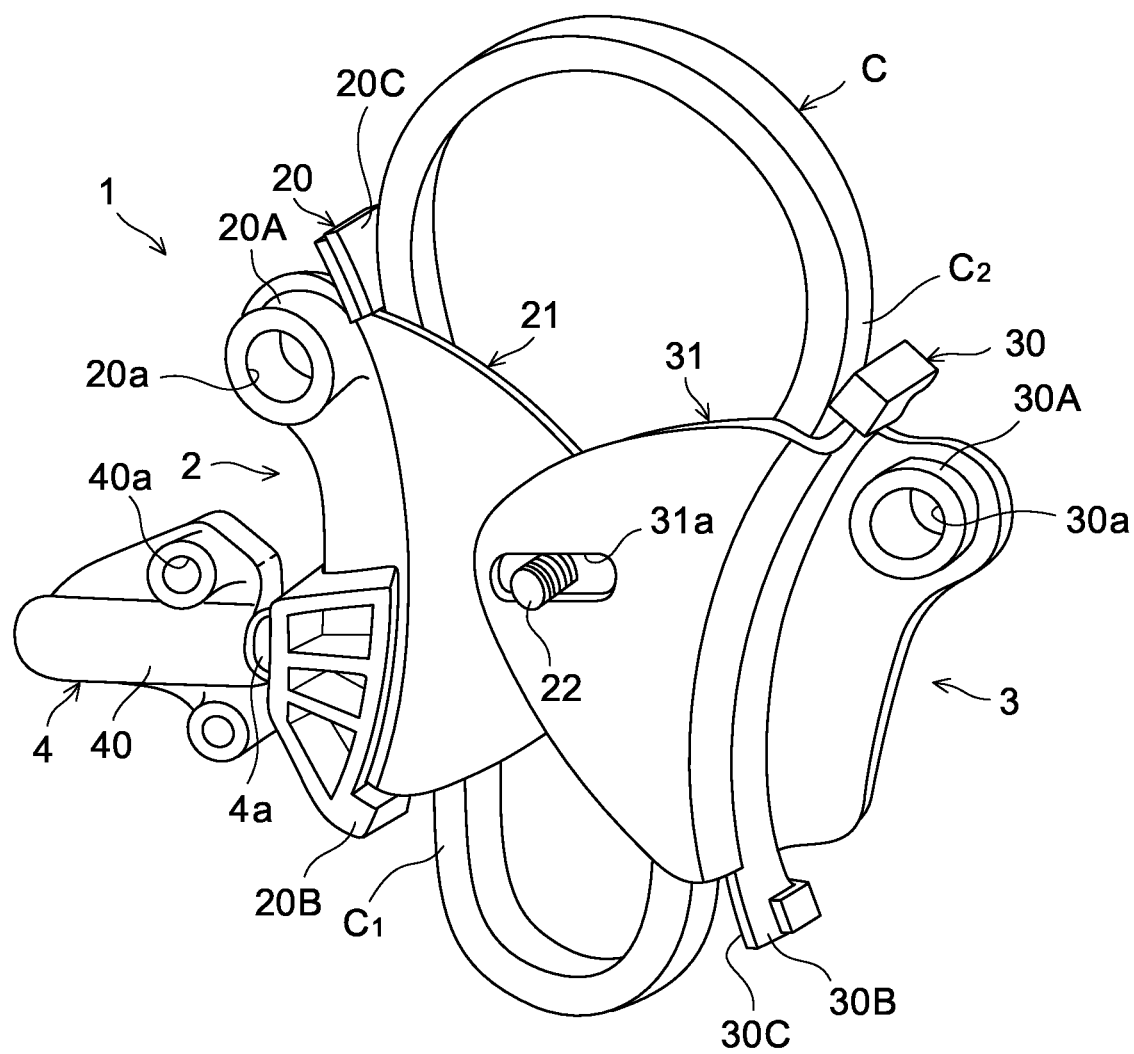
FIG. 2 shows the state in FIG. 1 when a retaining nut has been removed.
Figure 2A:
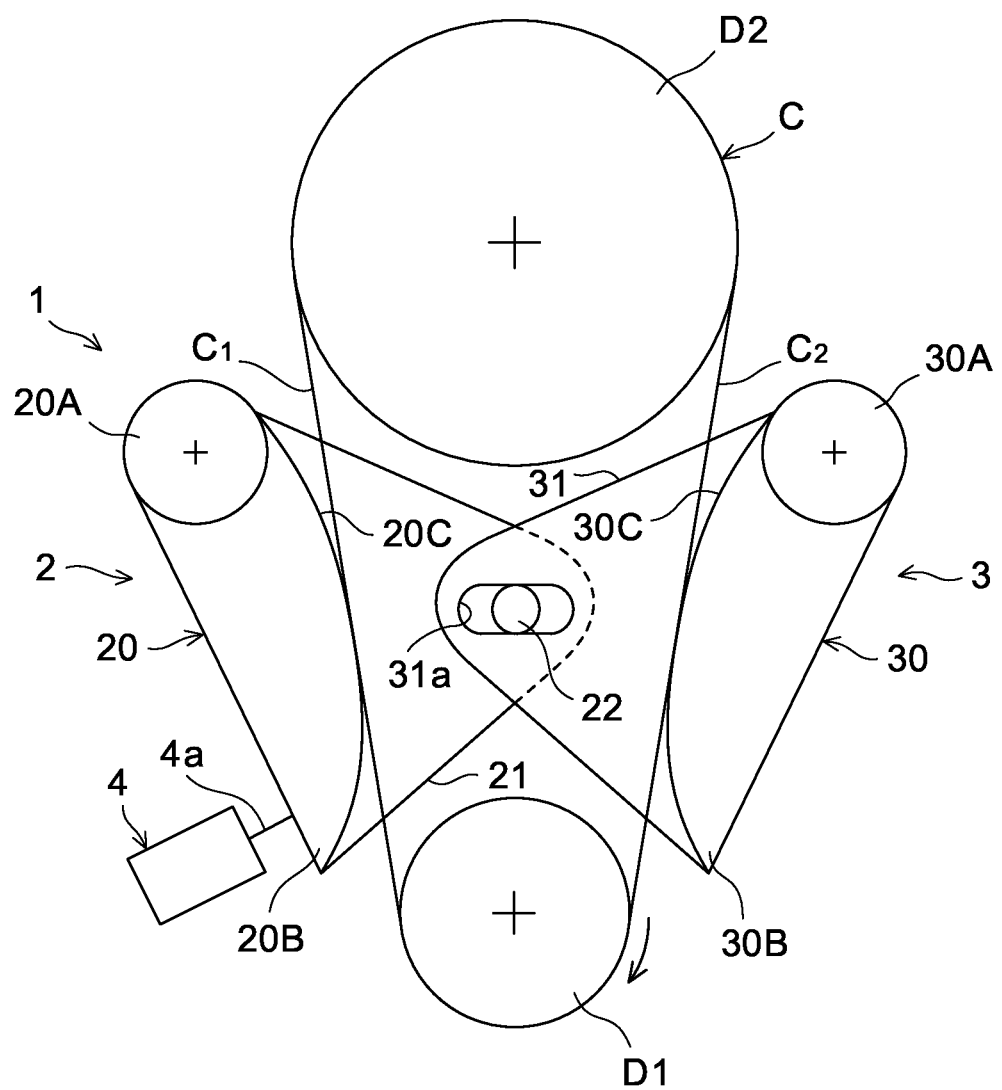
FIG. 2A is a schematic of FIG. 2.
Figure 3:
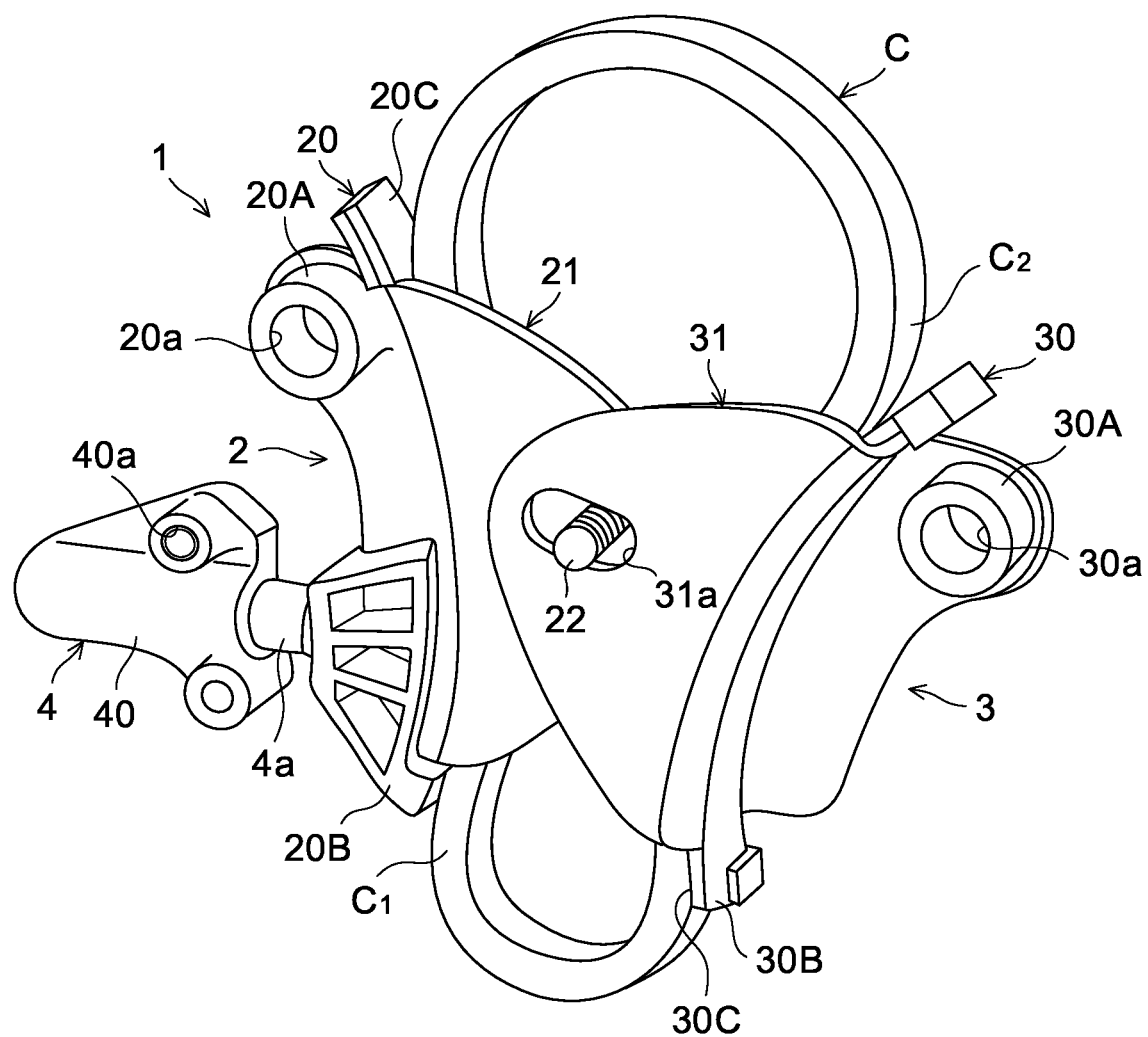
FIG. 3 shows the state when the chain in FIG. 1 has undergone elongation.
Figure 3A:
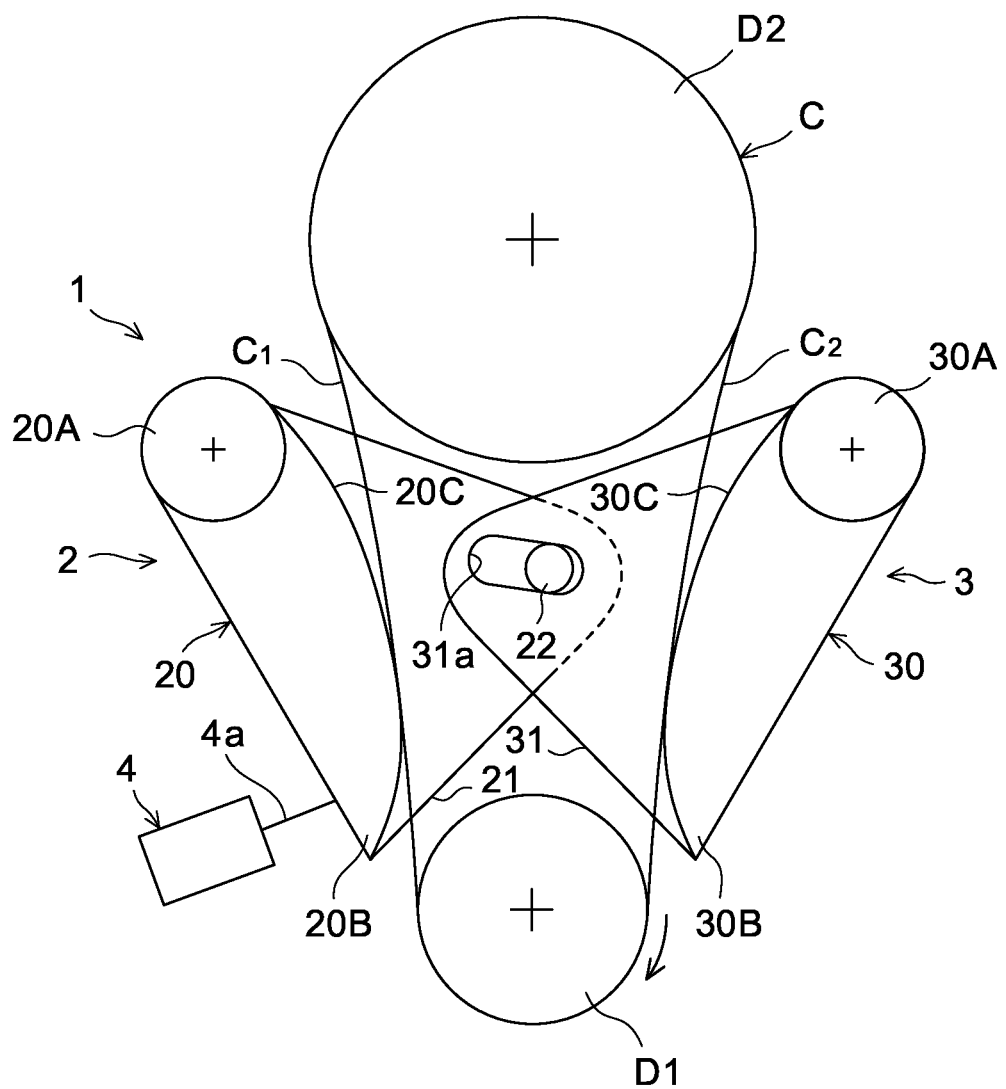
FIG. 3A is a schematic of FIG. 3.
Figure 4:
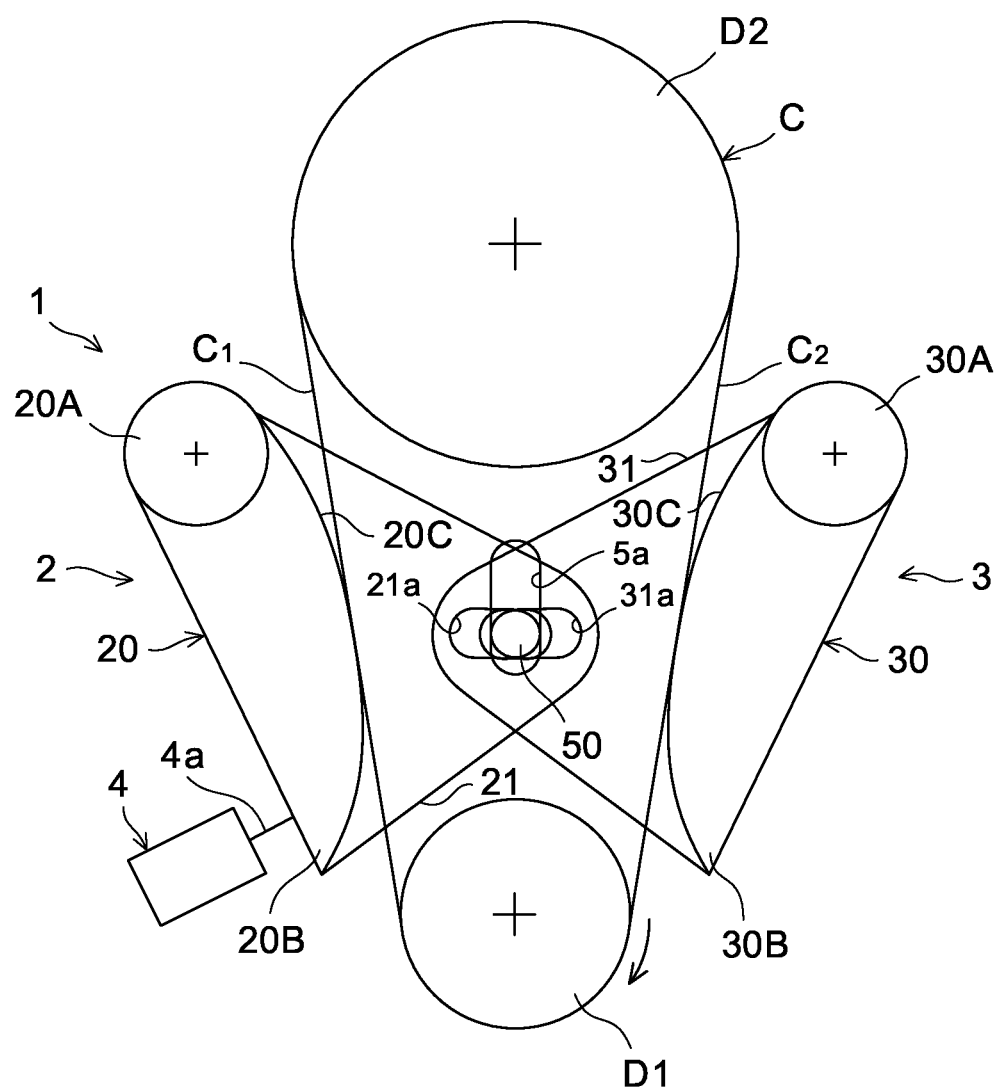
FIG. 4 is a schematic of the tensioning device according to the second mode of embodiment of the present invention.
Figure 4A:
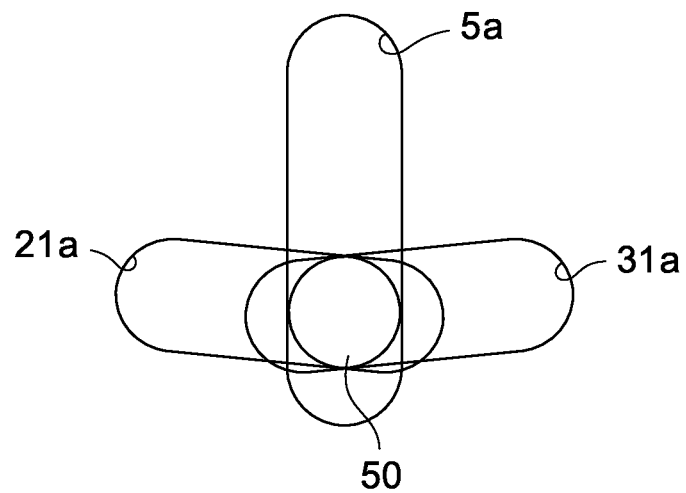
FIG. 4A is an enlarged partial view of FIG. 4.
Figure 5A:
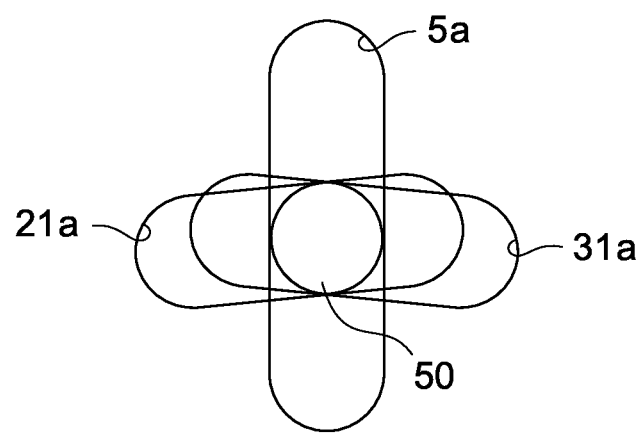
FIG. 5A is an enlarged partial view of FIG. 5.
Figure 5:
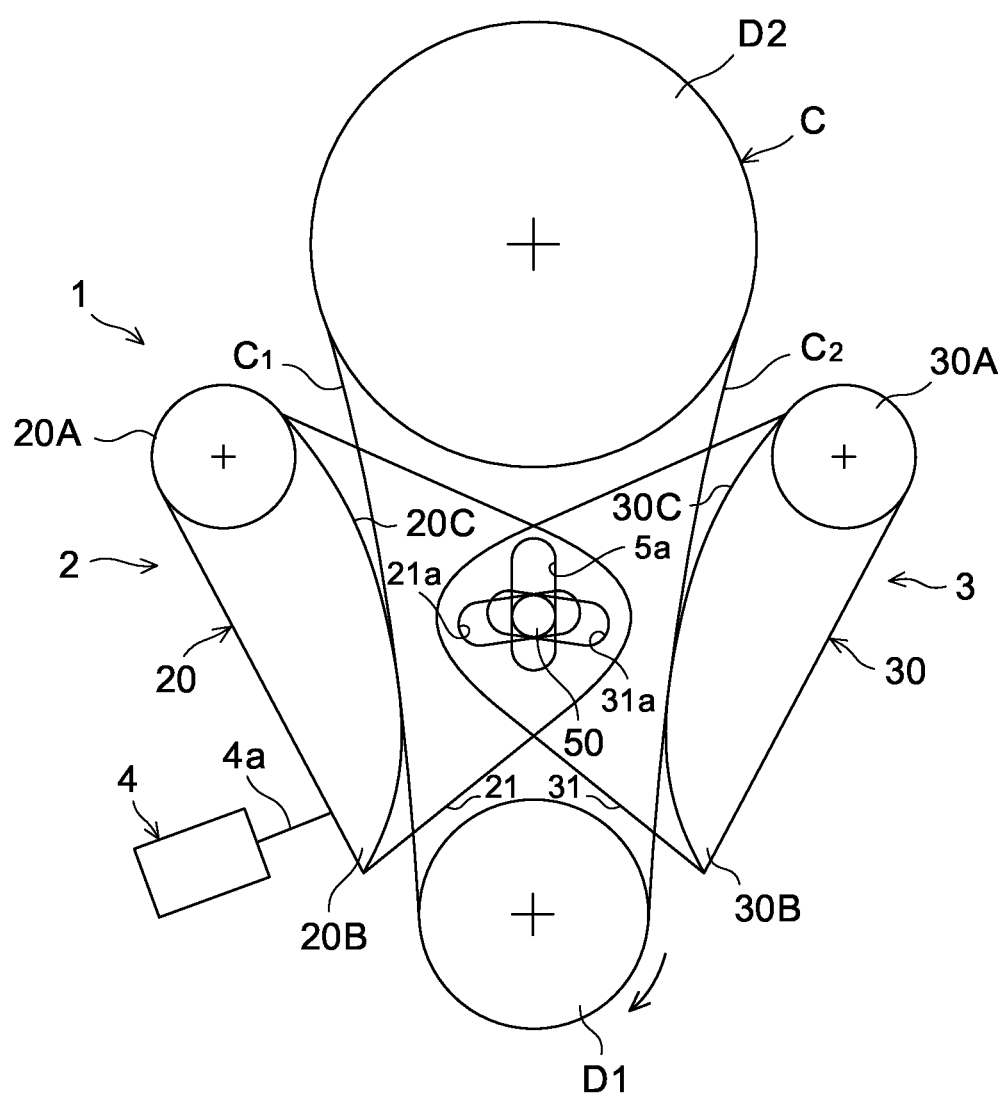
FIG. 5 shows the state when the chain in FIG. 4 has undergone elongation.
Figure 6:
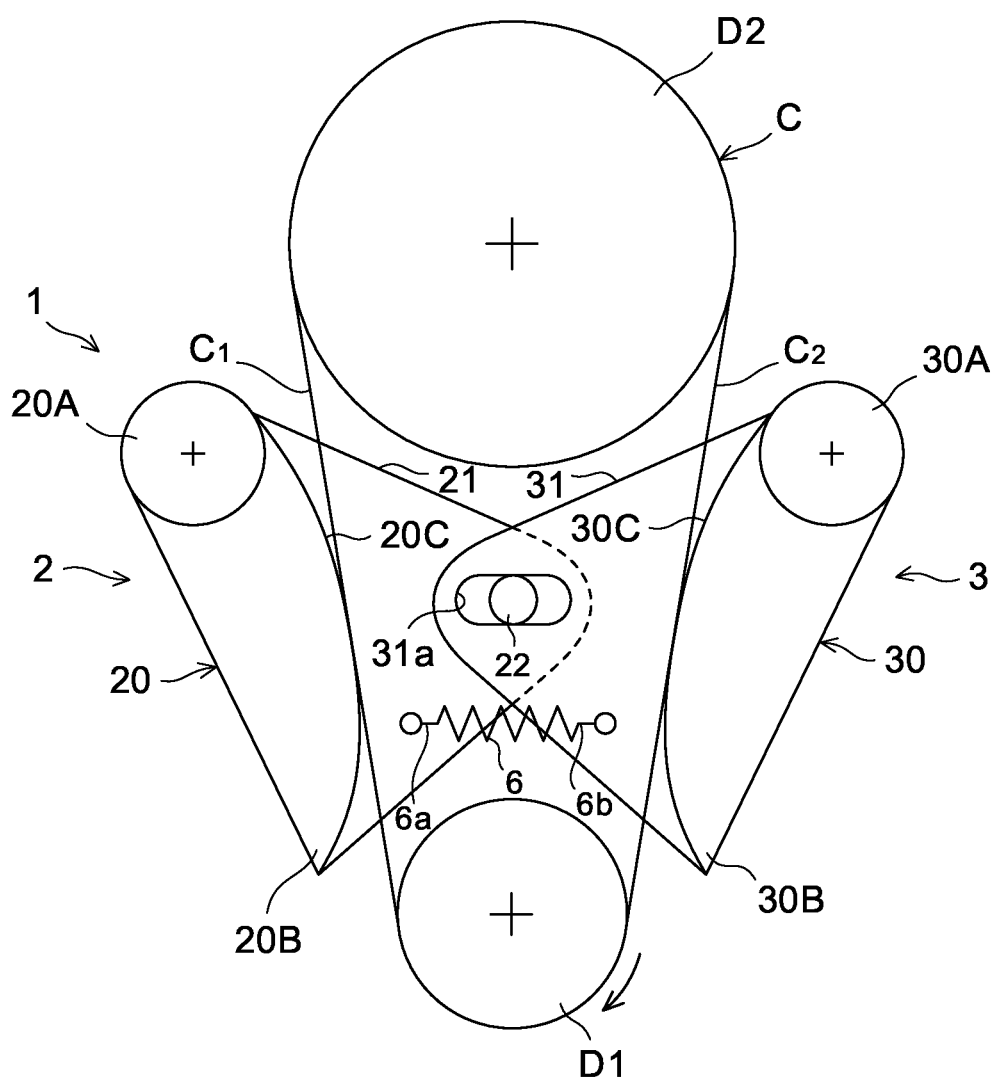
FIG. 6 is a schematic of the tensioning device according to the third mode of embodiment of the present invention.
Figure 7:
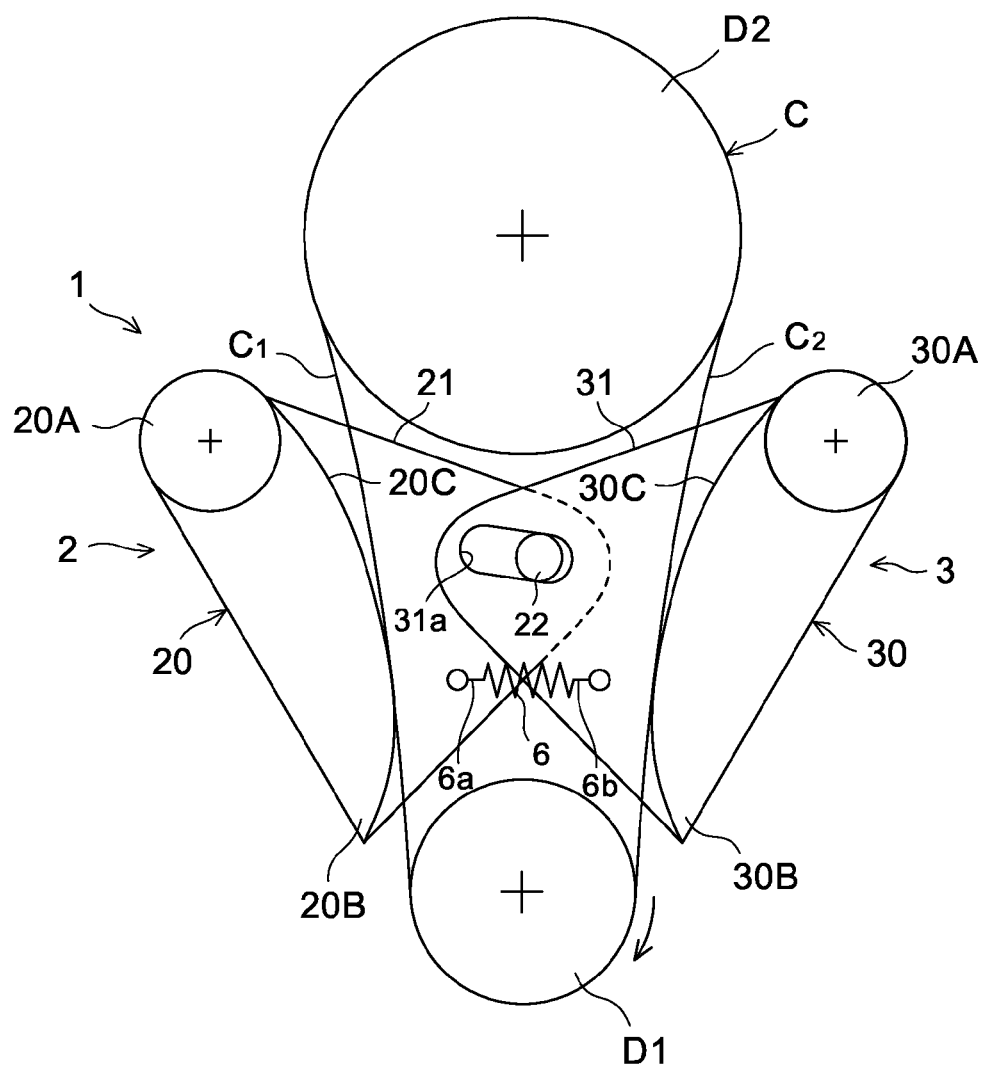
FIG. 7 shows the state when the chain in FIG. 6 has undergone elongation.
Figure 8:
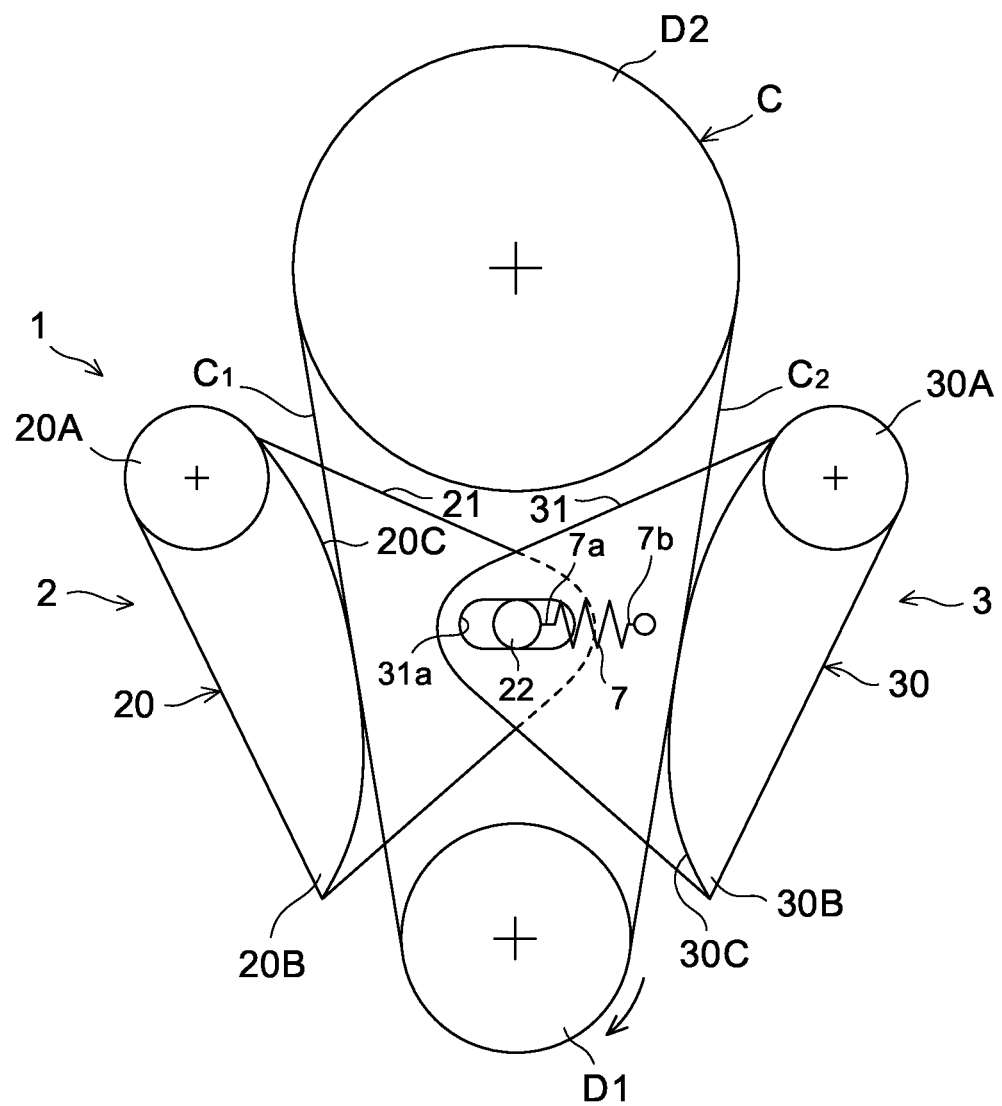
FIG. 8 is a schematic of the tensioning device according to the fourth mode of embodiment of the present invention.
Figure 9:
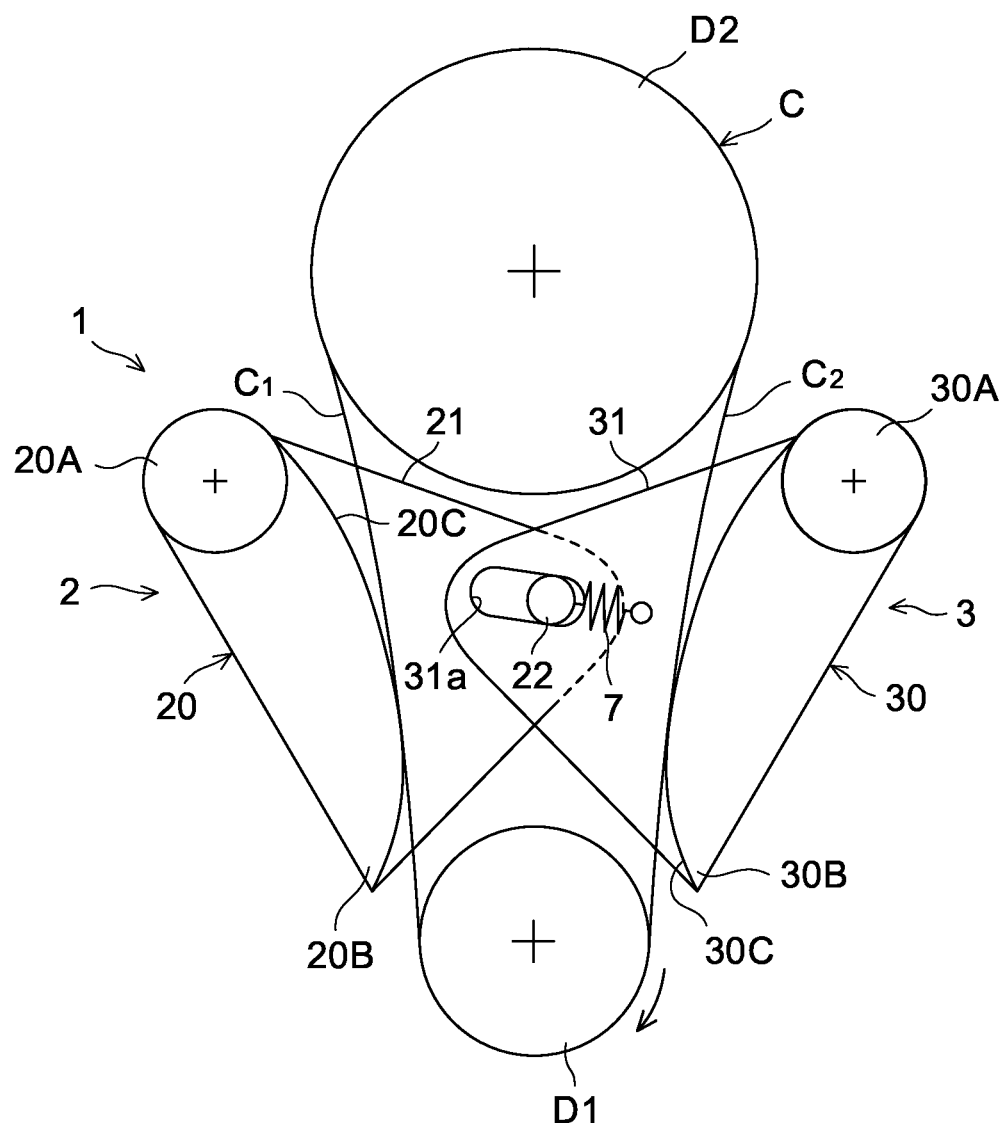
FIG. 9 shows the state when the chain in FIG. 8 has undergone elongation.
Figure 10:
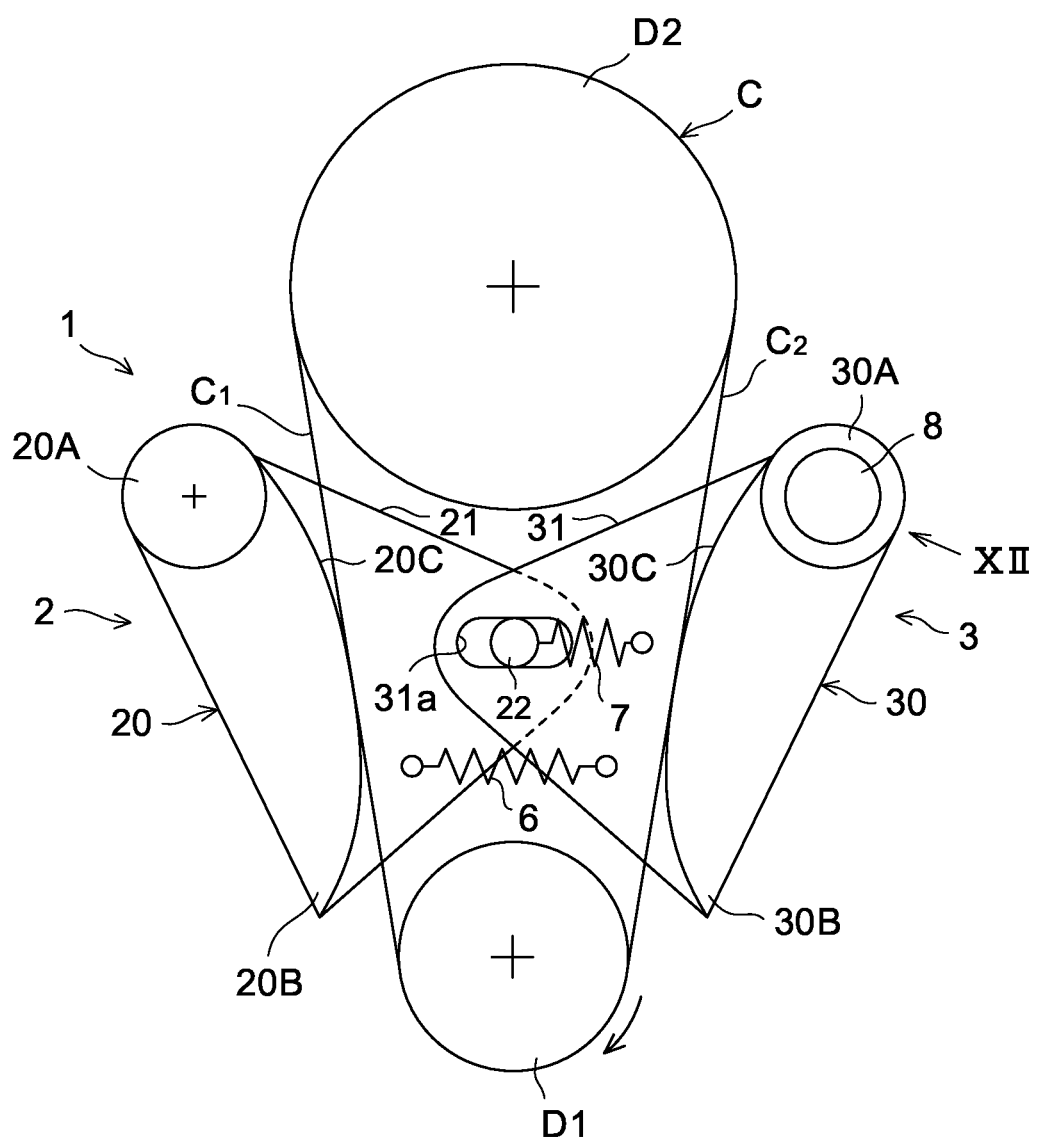
FIG. 10 is a schematic of the tensioning device according to the fifth mode of embodiment of the present invention.
Figure 11:
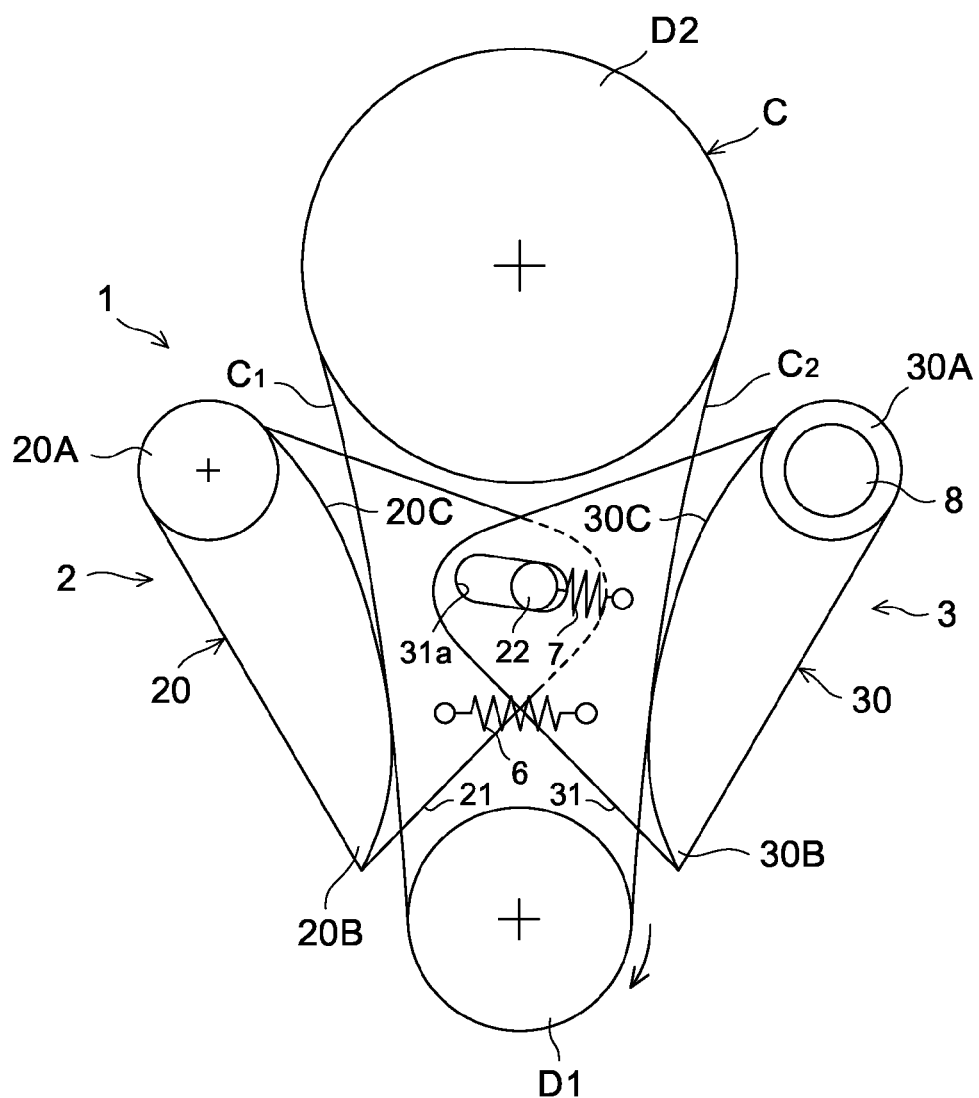
FIG. 11 shows the state when the chain in FIG. 10 has undergone elongation.
Figure 12:
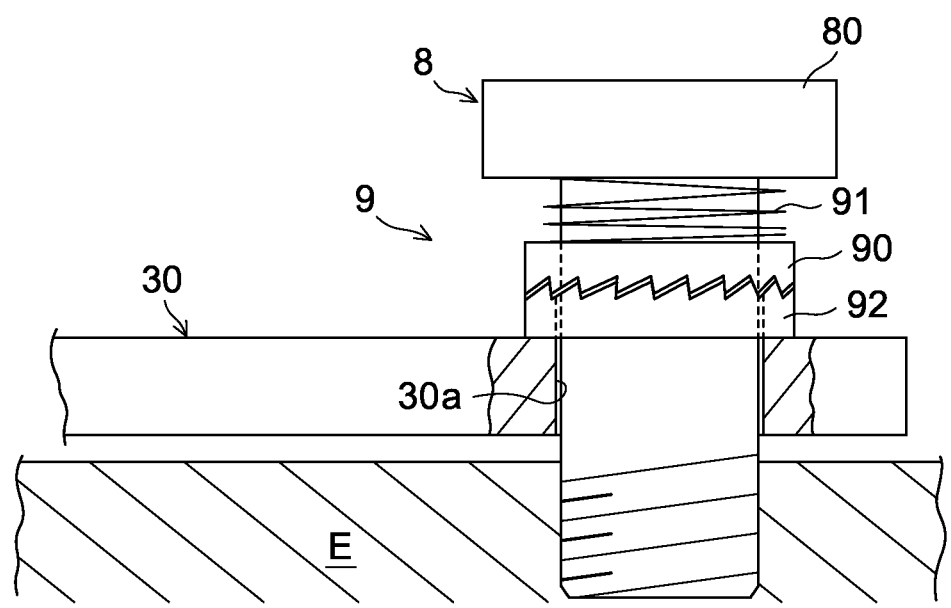
FIG. 12 is a partial view in cross section along the arrow XII in FIG. 10.
Figure 13:
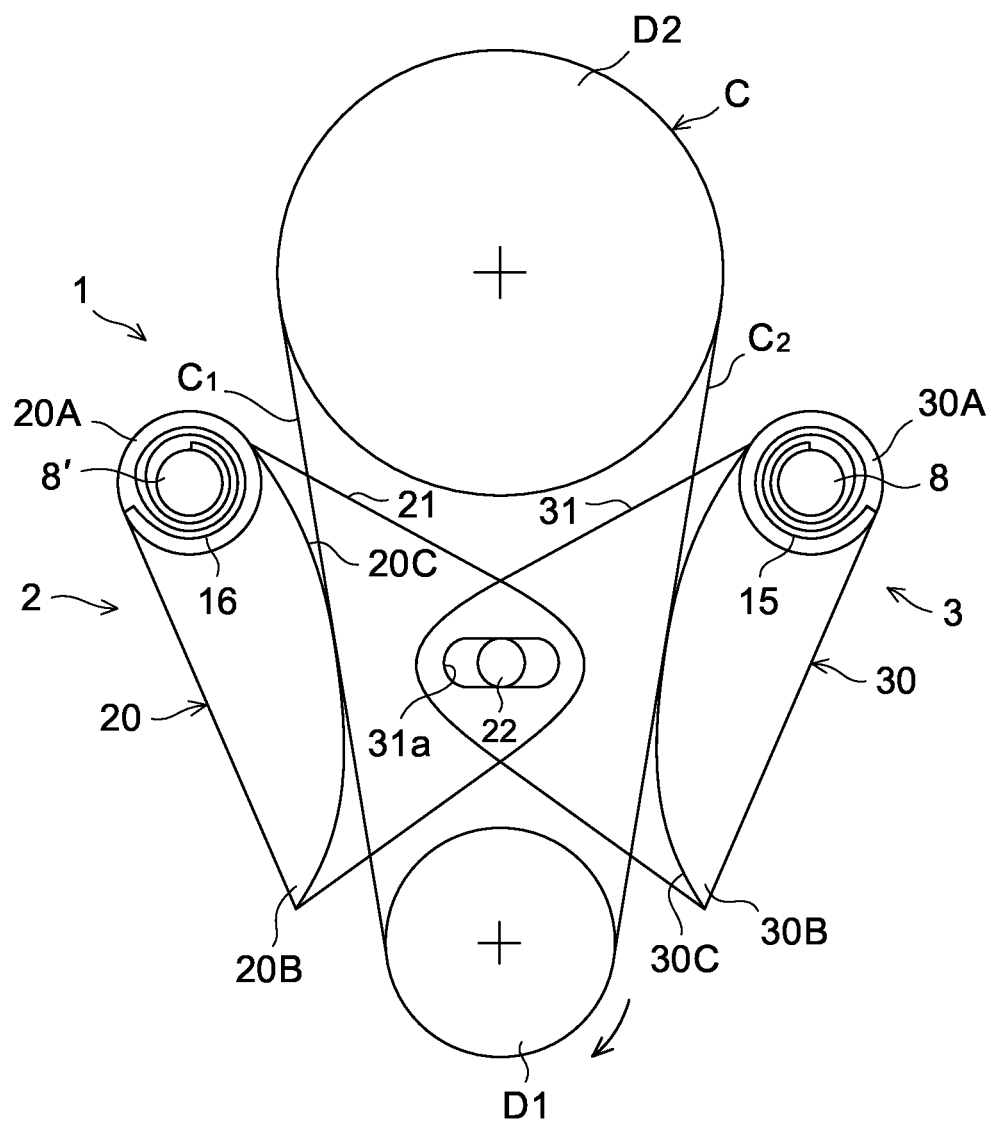
FIG. 13 is a schematic of the tensioning device according to the sixth mode of embodiment of the present invention.
Figure 14:
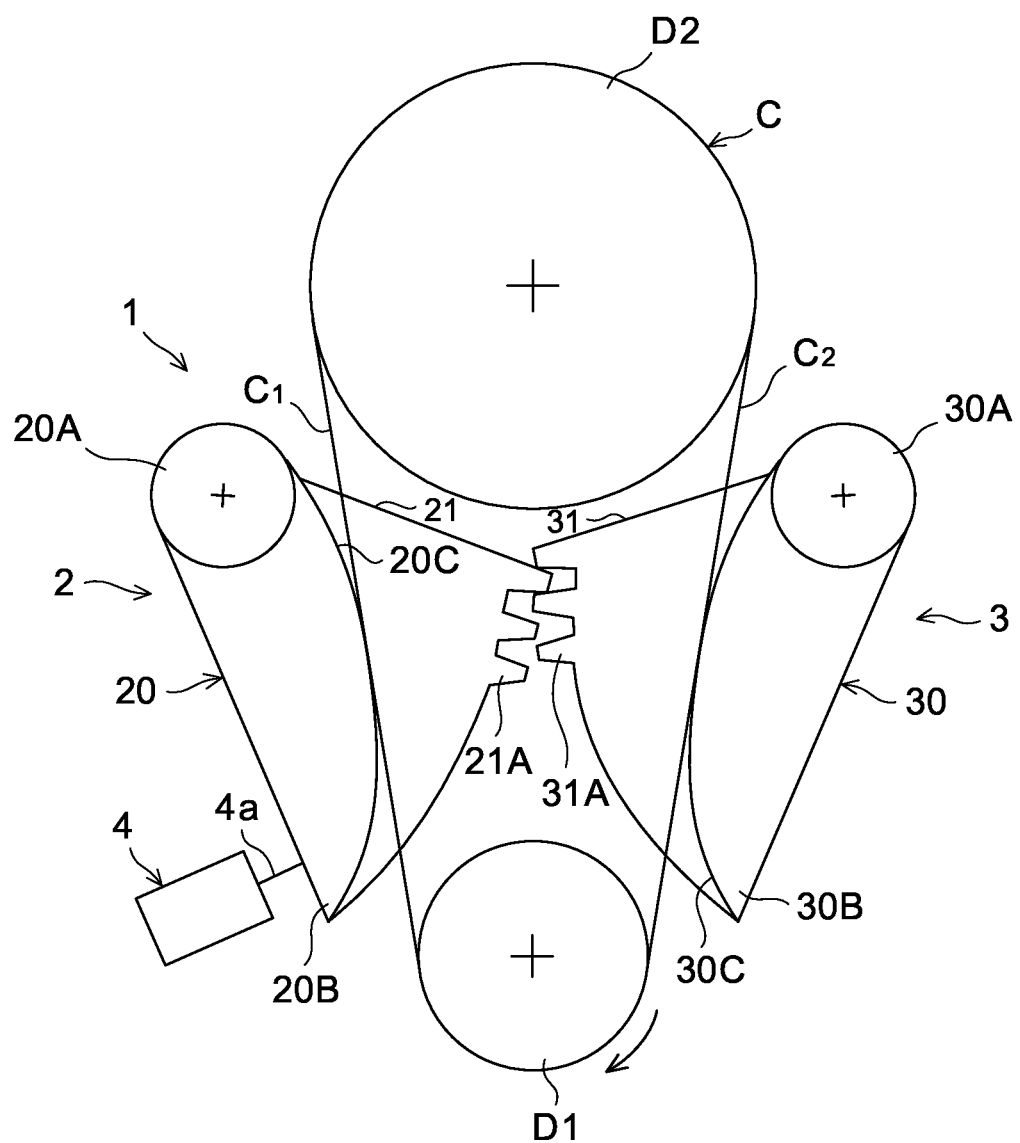
FIG. 14 is a schematic of the tensioning device according to the seventh mode of embodiment of the present invention.

1: tensioning device
2: first tensioner arm
20: first arm part
20A: pivoting end
20B: free end
21: first flange part
22: protrusion (linking part)
3: second tensioner arm
30: second arm part
30A: pivoting end
30B: free end
31: second flange part
31a: long hole (linking part)
4: tensioner (urging means)
C: chain
$C_1$: first chain span
$C_2$: second chain span

The invention claimed is:
1. A tensioning device for imparting a tensioning force to a chain having a first chain span and a second chain span, the tensioning device comprising:
 a first tensioner arm comprising:
  a first arm part slidingly receiving the chain, the first arm part extending in an arcuate shape along and outside the first chain span, the first arm part having a first pivoting end pivotably supported by a first spindle and a first free end; and a first flange part integral with the first arm part and projecting toward the internal space between the first chain span and the second chain span;

a second tensioner arm comprising:

a second arm part slidingly receiving the chain, the second arm part extending in an arcuate shape along and outside the second chain span, the second arm part having a second pivoting end pivotably supported by a second spindle and a second free end; and a second flange part integral with the second arm part, projecting toward the internal space between the first and second chain spans, and overlapping the first flange part;

a linking part pivotably linking the first flange part and the second flange part, the linking part comprising:

a first long hole formed through a portion of the second flange part overlapping the first flange part; and a protrusion linked to the first flange part, engaging the first long hole, and slideable in the first long hole; and urging means for urging the first free end of the first tensioner arm toward the first chain span; and when the urging means urges the first free end of the first tensioner arm toward the first chain span, the first flange part of the first tensioner arm causes the second flange part of the second tensioner arm to pivot by way of the linking part, so that the second arm part of the second tensioner arm moves toward the second chain span.

2. The tensioning device as claimed in claim 1, wherein protrusion protrudes from the first flange part and engages with the long hole, while also being able to slide in the long hole.

3. The tensioning device as claimed in claim 1, wherein the linking part further comprises:

a second long hole formed through a portion of the first flange part overlapping the second flange part and partly overlapping the first long hole; and a third long hole a mounting side of the tensioning device and extending in a direction intersecting the first long hole and the second long hole while partly overlapping the first long hole and the second long hole;

wherein the protrusion is latched by the first long hole, the second long hole, and the third long hole while protruding from the third long hole and is along first long hole, the second long hole, and the third long hole when the first flange part and the second flange part pivot.

4. The tensioning device as claimed in claim 1, wherein the urging means comprises a tensioner disposed outside the first chain span comprising a retractable piston.

5. The tensioning device as claimed in claim 1, wherein the urging means comprises a tension spring having one end latched to the first flange part and the other end latched to the second flange part.

6. The tensioning device as claimed in claim 1, wherein the first spindle or the second spindle is provided with a ratchet mechanism for allowing the first tensioner arm or the second tensioner arm to move toward the first chain span or the second chain span, while restricting movement in the opposite direction.

7. The tensioning device as claimed in claim 1, wherein the first spindle or the second spindle is provided with a torsion coil spring for urging the first tensioner arm or the second tensioner arm toward the first chain span or the second chain span.

8. The tensioning device as claimed in claim 1, wherein the chain is an auxiliary drive chain or an oil pump drive chain for an engine.

9. A tensioning device for imparting a tensioning force to a chain having a first chain span and a second chain span, the tensioning device comprising:

a first tensioner arm comprising:

a first arm part slidingly receiving the chain, the first arm part extending in an arcuate shape along and outside the first chain span, the first arm part having a first pivoting end pivotably supported by a first spindle and a first free end; and a first flange part integral with the first arm part and projecting toward the internal space between the first chain span and the second chain span;

a second tensioner arm comprising:

a second arm part slidingly receiving the chain, the second arm part extending in an arcuate shape along and outside the second chain span, the second arm part having a second pivoting end pivotably supported by a second spindle and a second free end; and a second flange part integral with the second arm part, projecting toward the internal space between the first and second chain spans, and overlapping the first flange part;

a linking part pivotably linking the first flange part and the second flange part, the linking part comprising:

a first long hole formed through a portion of the second flange part overlapping the first flange part; and a protrusion protruding from the first flange part, engaging the first long hole, and slideable in the first long hole; and urging means for urging the first free end of the first tensioner arm toward the first chain span; and when the urging means urges the first free end of the first tensioner arm toward the first chain span, the first flange part of the first tensioner arm causes the second flange part of the second tensioner arm to pivot by way of the linking part, so that the second arm part of the second tensioner arm moves toward the second chain span.

* * * * *